United States Patent
Makaran et al.

(10) Patent No.: US 6,933,687 B2
(45) Date of Patent: Aug. 23, 2005

(54) DUAL MOTOR CONFIGURATION WITH PRIMARY BRUSHLESS MOTOR AND SECONDARY INTEGRATED SPEED CONTROL MOTOR

(75) Inventors: John Makaran, Ontario (CA); Erich Maier, Wuerzburg (DE)

(73) Assignee: Siemens VDO Automotive Inc., Mississauga (CA)

( * ) Notice: Subject to any disclaimer, the term of this patent is extended or adjusted under 35 U.S.C. 154(b) by 3 days.

(21) Appl. No.: 10/263,633

(22) Filed: Oct. 3, 2002

(65) Prior Publication Data

US 2004/0066156 A1 Apr. 8, 2004

(51) Int. Cl.[7] ............................................. H02P 5/46
(52) U.S. Cl. .................... 318/34; 318/67; 318/77; 318/78; 318/265; 318/268; 318/66; 417/423.5; 417/426; 123/26; 123/41.11; 123/41.12
(58) Field of Search ..................... 318/51, 59, 66, 318/67, 68, 138, 254, 439, 34, 77, 78, 265, 268; 417/423.5, 426; 123/26, 41.11, 41.12

(56) References Cited

U.S. PATENT DOCUMENTS

| | | | | |
|---|---|---|---|---|
| 2,635,218 A | | 4/1953 | Dupy ........................... 318/82 |
| 3,648,138 A | * | 3/1972 | Kalis ........................... 318/801 |
| 4,051,691 A | * | 10/1977 | Dawkins ........................ 62/236 |
| 4,514,665 A | * | 4/1985 | Melocik et al. ............. 318/139 |
| 4,651,922 A | | 3/1987 | Noba ............................ 236/35 |
| 4,779,577 A | * | 10/1988 | Ritter et al. ............. 123/41.05 |
| 4,988,930 A | * | 1/1991 | Oberheide .................... 318/82 |
| 5,371,445 A | | 12/1994 | Couetoux ..................... 318/41 |
| 5,478,214 A | * | 12/1995 | Howarth et al. .......... 417/423.5 |
| 5,660,149 A | * | 8/1997 | Lakerdas et al. ........ 123/41.44 |
| 5,957,663 A | * | 9/1999 | Van Houten et al. ......... 417/13 |
| 5,970,925 A | | 10/1999 | Lakerdas et al. ........ 123/41.11 |
| 6,199,398 B1 | | 3/2001 | Takeuchi et al. ........... 62/323.1 |
| 2002/0155804 A1 | | 10/2002 | Poutot et al. ................. 454/75 |

* cited by examiner

*Primary Examiner*—Rita Leykin

(57) ABSTRACT

A dual motor configuration 10 is provided for driving two fans for moving air to cool an engine. The dual motor configuration includes a primary brushless motor 18 constructed and arranged to be electronically controlled to drive a first fan 16 over a range of speeds. A secondary brush motor 24 is constructed and arranged to be electronically controlled to drive a second fan 22 over a range of speeds. The secondary brush motor includes an electronic switching device 26 associated therewith for receiving a pulse width modulated signal for controlling speed of the secondary brush motor. Thus, different combinations of speeds of the first and second motors can be selectively chosen to meet cooling requirements.

18 Claims, 2 Drawing Sheets

DUAL MOTOR CONFIGURATION WITH PRIMARY BRUSHLESS MOTOR AND SECONDARY INTEGRATED SPEED CONTROL MOTOR

BACKGROUND OF THE INVENTION

The present invention relates generally to electric motors for automobile engine cooling applications and, more particularly, to a dual motor configuration having a primary brushless motor and a secondary brush motor with integrated speed control.

In engine cooling applications, there is a need for dual engine cooling fans. Conventionally, this has been achieved using dual brush motors. Wound field-type motors generally have speed controlled by altering the field flux. This is done by changing the current or the number of coil turns in the field winding. With these types of motors, however, the number of speeds available is limited.

Accordingly, there is a need to provide a dual motor configuration for an engine cooling application whereby different combinations of speeds of first and second motors can be selectively chosen to meet cooling requirements of an engine.

SUMMARY OF THE INVENTION

An object of the invention is to fulfill the need referred to above. In accordance with the principles of the present invention, this objective is achieved by providing a dual motor configuration for driving two fans for moving air to cool an engine. The dual motor configuration includes a primary brushless motor constructed and arranged to be electronically controlled to drive a first fan over a range of speeds. A secondary brush motor is constructed and arranged to be electronically controlled to drive a second fan over a range of speeds. The secondary brush motor includes an electronic switching device associated therewith for receiving a pulse width modulated signal for controlling speed of the secondary brush motor, whereby different combinations of speeds of the first and second motors can be selectively chosen to meet cooling requirements In accordance with another aspect of the invention, a method is provided for controlling a dual motor configuration for driving first and second fans for moving air to cool an engine. The dual motor configuration includes a primary brushless motor for driving the first fan, and a secondary brush motor for driving the second fan. The secondary brush motor includes an electronic switching device associated therewith. According to the method, a control signal is received at the primary brushless motor to control operation of the primary brushless motor. A pulse width modulated control signal is received at the electronic switching device to control operation of the secondary brush motor, such that different combinations of speeds of the first and second motors can be selectively chosen to meet cooling requirements of an engine.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

Preferred embodiments of the invention are described in greater detail herein below with reference to the drawings wherein.

DETAILED DESCRIPTION OF THE PREFERRED EMBODIMENTS

Figure 1A:
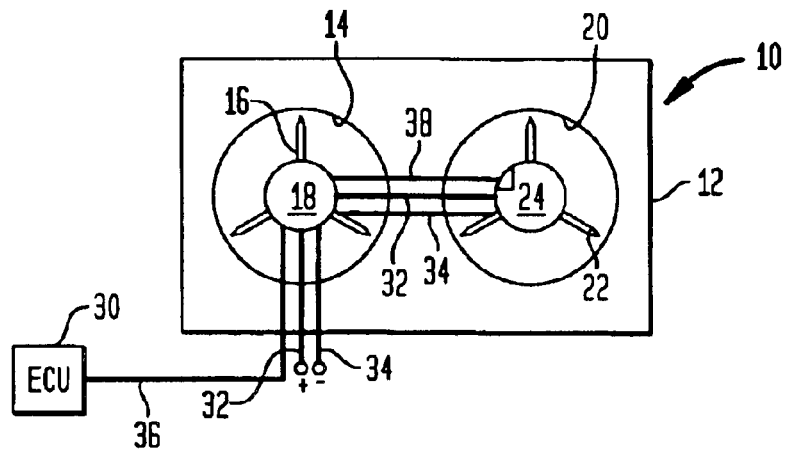
FIG. 1A is schematic illustration of a dual motor configuration provided in accordance with the principles of a first embodiment of the present invention, showing a secondary motor being controlled and powered through a primary motor.

Referring to the drawings wherein like numerals identify similar or like elements through the several views, FIG. 1A illustrates a first embodiment of a dual motor cooling configuration, generally indicated at 10, for cooling an engine (not shown) of a vehicle. The cooling configuration 10 includes a shroud structure 12 having a first opening 14 therethrough receiving a first fan 16. A primary, conventional d.c. brushless motor 18 is mounted with resect to the shroud structure 12 and is electronically controlled to drive the first fan 16 at a variety of different speeds, for example, 0 to 4000 rpm. The primary brushless motor 18 may be of the type, and controlled, as disclosed in U.S. Pat. No. 5,744,921, the entire contents of which is hereby incorporated by reference into present specification.

A second opening 20 is provided through the shroud structure 12 is adjacent to first opening 14. The second opening receives a second fan 22. A secondary, integrated speed control motor 24 is mounted with respect to the shroud structure 12 and is electronically controlled to drive the second fan 16 at a variety of different speeds, for example 0 to 4000 rpm. The secondary motor 24 is a permanent magnet, brush-type motor including an electronically controlled switching device 26 associated therewith. The switching device 26 may be a MOSFET, SCR, IGBT, GTO or even a relay. In the embodiment, a MOSFET is shown. The secondary motor 24 is preferably of the type disclosed in commonly owned, co-pending U.S. application Ser. No. 09/113,415, entitled "Pulse Width Modulated Engine Cooling Fan Motor With Integrated MOSFET", the entire content of which is hereby incorporated into the present specification by reference.

Figure 3:
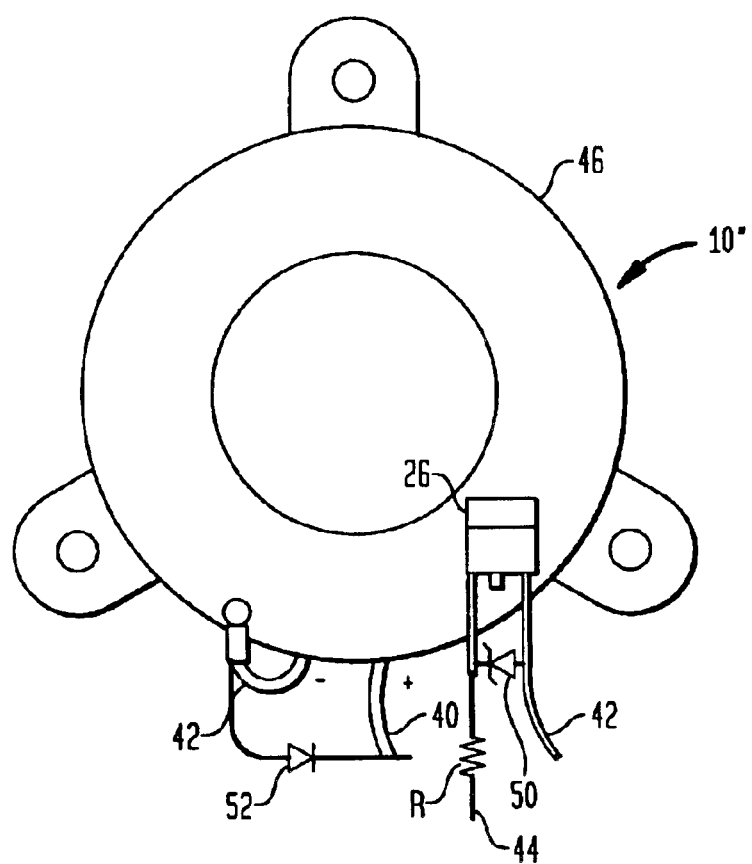
FIG. 3 is a schematic view of an end of the secondary motor of the invention showing a MOSFET coupled thereto.

With reference to FIG. 3, the switching device or MOSFET 26 is shown to be mounted directly to the end cap 28 or other housing portion of the secondary motor 24. The MOSFET 26 need not be mounted on the secondary motor 24 but can be provided in a location so as to be electrically connected between the secondary motor 24 and a controller, such as an engine control unit (ECU) 30. As discussed more fully below, if the secondary motor is controlled by the primary motor 18, the MOSFET may be electrically connected between the primary motor 18 and the secondary motor 24.

With reference to the embodiment FIG. 1A, the secondary motor 24 derives its control and power from the primary motor 18. Thus, the primary motor 18 is powered by a positive lead 32 and a negative lead 34, which also provide power to the secondary motor 24. A control signal is provided from the ECU 30 to the primary motor 18 via line 36. Secondary motor 24 receives a control signal from the primary motor 18 via line 38. In this manner, the primary motor 18 interprets the signal from the ECU 30 and gives the appropriate output signal to the secondary motor 24. Control of the motors can be based on sensed engine temperature.

Figure 1B:
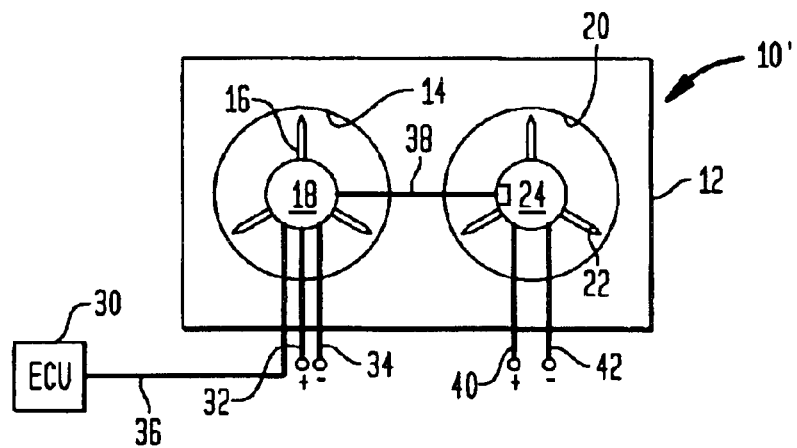
FIG. 1B is schematic illustration of a dual motor configuration provided in accordance with the principles of a second embodiment of the present invention, showing a secondary motor being controlled through a primary motor with the primary motor and secondary motor being powered separately.

FIG. 1B shows a second embodiment of a cooling configuration of the invention, generally indicated at 10'. The components of configuration 10' are the same as disclosed above with resect to the configuration 10 of FIG. 1A, however, the primary motor 18 and the secondary motor 24 are powered individually. Thus, power leads 40 and 42 power the secondary motor 24 separate from power leads 32 and 34 of the primary motor 18. The primary motor 18 interprets the signal from the ECU 30 and gives the appropriate output signal to the secondary motor 24.

For the embodiments of FIGS. 1A and 1B, fault handling can be made in the following manner. For over voltage protection, the primary motor 18 is capable of sensing the system voltage and enable or signal the secondary motor 24 accordingly. In addition, the primary motor 18 is capable of sensing stall conditions from itself or the secondary motor 24 and of tailoring cooling operation accordingly. If, for example, the secondary motor 24 is stalled, the primary motor 18 can obtain a stall diagnostic from the secondary motor 24 and signal the vehicle ECU 30 and increase the speed of the primary motor 18 compensate from the loss of cooling from the secondary motor 24. In a similar manner, if the primary motor 18 is stalled, the primary motor 18 can signal the ECU 30 and cause the secondary motor 24 to operate at a faster speed.

Figure 1C:
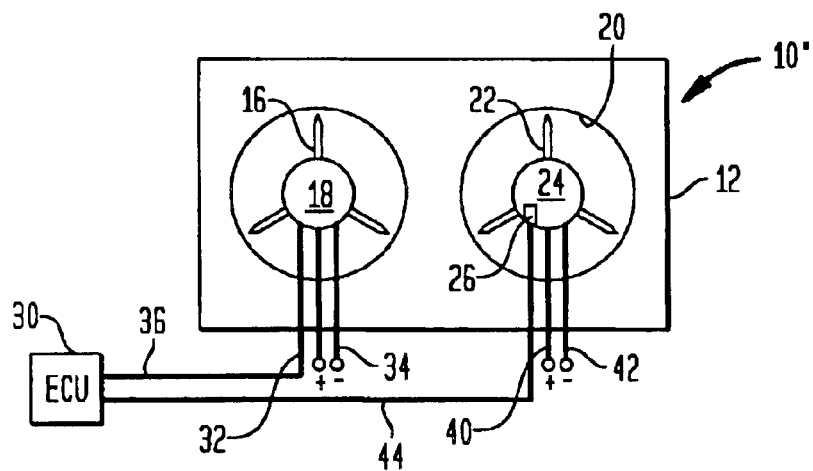
FIG. 1C is schematic illustration of a dual motor configuration provided in accordance with the principles of a third embodiment of the present invention, showing a primary motor and a secondary motor being controlled and powered separately.
Figure 2:
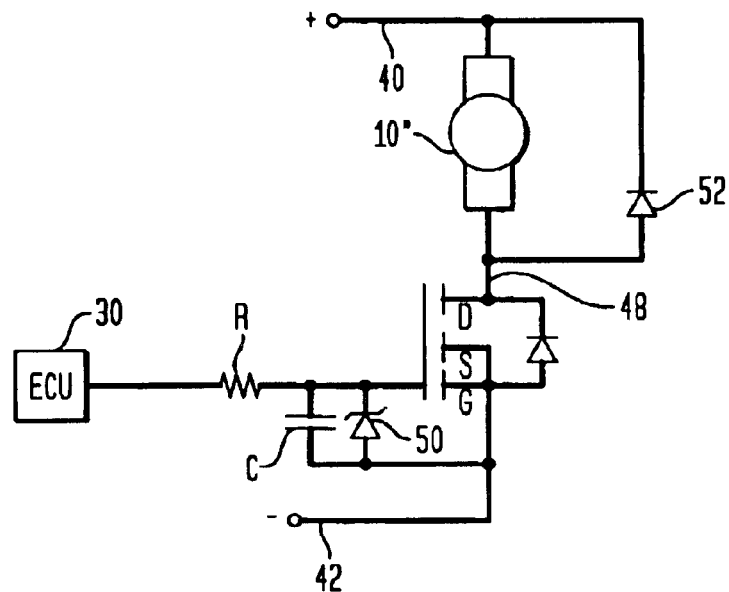
FIG. 2 is a schematic illustration of a circuit of the secondary motor of FIG. 3 shown electrically coupled to an electronic control unit of a vehicle.

FIG. 1C shows a third embodiment of a cooling configuration of the invention, generally indicated at 10". The components of configuration 10' are the same as disclosed above with resect to the configuration 10 of FIG. 1A, however, the primary motor 18 and the secondary motor 24 are powered and controlled individually. Thus, power leads 40 and 42 power the secondary motor 24 separate from power leads 32 and 34 of the primary motor 18. In addition, a control signal, e.g., from the ECU 30, is received by the secondary motor 24 though separate line 44. As seen in FIGS. 2 and 3, the negative lead 42 is secured to a metal end cap 46 of the secondary motor 24. Only three lead wires stem from the motor 24: positive lead 40, negative lead 42 and control signal lead 44. The MOSFET drain terminal D is connected to a negative brush card assembly lead of the motor 24 via a lead wire 48. The MOSFET source terminal S is connected to ground or the negative motor terminal. The MOSFET gate terminal G is connected to a PWM output from the vehicle's ECU 30. The ECU 30 is constructed and arranged to generate a varying PWM signal based on the load requirement of the motor 24 that is sent directly to the gate terminal G. This allows a multiple of motor speed operations for the secondary motor 24.

In the embodiment of FIG. 1C and FIG. 3, a zener diode 50 is provided between the gate G and drain D of the MOSFET 26 to protect the MOSFET from over-voltage transients when the MOSFET is switched under a heavy load. A resistor R is provided in series with the MOSFET gate G to protect the ECU output stage from failure due to rapid charging and discharging of the MOSFET gate G. A free-wheeling diode 52 is provided between the positive and negative terminals of the motor 24. The zener diode 50, resistor R and free-wheeling diode 52 can be mounted on the brush card assembly of the motor 24, or provided in a separate structure. It can be appreciated that no relays or switches are required since the MOSFET acts as the switch applying current to the motor windings based on the PWM signal received.

The motor 24 can be controlled by a low frequency PWM signal (50 to 400 Hz typical). The switching frequency, however, is not limited to lower frequencies. If the control circuitry and the heatsinking of the MOSFET are modified, higher frequencies could be used.

The low frequency PWM signal can be delivered to the motor 24 using the output of the ECU 30 or, if full speed operation of the motor 24 is desired, the speed input to the motor 24 can be achieved using temperature sensors.

The low frequency PWM signal can be modulated in such a manner to avoid mechanical resonance. For example, if the fundamental PWM frequency is 50 Hz, the PWM frequency can be modulated 5 Hz on either side of 50 Hz in a random, or pseudo random fashion.

For starting conditions, a soft feature can be implemented by ramping up the PWM duty cycle from 0% to the desired PWM duty cycle. In order to ensure a gradual increase in current through the switching device, a capacitor C (FIG. 2) can be connected from the gate of the MOSFET 26 to ground. The capacitor, in addition to the series resistor R, acts as a low pass filter in series with the MOSFET gate G. If the PWM frequency is high enough, the linear increase in the MOSFET gate voltage would result in a gradual increase in the MOSFET drain current. This increase in the MOSFET drain current would occur until the motor back EMF is built-up to the desired running speed, at which point the motor switches to a lower frequency PWM signal to control the speed of the motor 24.

In all of the embodiments, the primary motor 18 contains stall protection and over current detection. The primary motor 18 also contains its own commutation logic and can be controlled by an 8 bit or 16-bit processor.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A dual motor configuration for driving two fans for moving air to cool an engine, the dual motor configuration comprising:
    a primary brushless motor constructed and arranged to be electronically controlled to drive a first fan over a range of speeds, and
    a secondary brush motor constructed and arranged to be electronically controlled to drive a second fan over a range of speeds, the secondary brush motor including an electronic switching device associated therewith for receiving a variable frequency pulse width modulated signal for controlling speed of the secondary brush motor, whereby different combinations of speeds of the first and second motors can be selectively chosen to meet cooling requirements of an engine,
    wherein each of the primary brushless motor and the secondary brush motor is constructed and arranged to be controlled to operate over a speed range of 0 to 4000 rpm.

2. The configuration of claim 1, wherein the electronic switching device is a metal oxide semiconductor field effect transistor (MOSFET).

3. The configuration of claim 2, wherein the MOSFET is made integral with the secondary brush motor.

4. The configuration of claim 1, further including a shroud, the primary brushless motor and the secondary brush motor being mounted with respect to the shroud.

5. The configuration of claim 1, wherein the primary brushless motor is constructed and arranged to control operation of the secondary brush motor.

6. The configuration of claim 1, in combination with a controller, the controller being constructed and arranged to control operation of the primary brushless motor and the secondary brush motor.

7. The combination of claim 6, wherein the controller is part of an engine control unit.

8. A method of controlling a dual motor configuration for driving first and second fans for moving air to cool an engine, the dual motor configuration including a primary brushless motor for driving the first fan over a speed range of 0 to 4000 rpm, and a secondary brush motor for driving the second fan over a speed range of 0 to 4000 rpm, the secondary brush motor including a electronic switching device associated therewith, the method including:
receiving, at the primary brushless motor, a control signal to control operation of the primary brushless motor, and
receiving, at the electronic switching device, a variable frequency pulse width modulated control signal to control operation of the secondary brush motor, such that different combinations of speeds of the first and second motors can be selectively chosen to meet cooling requirements of an engine.

9. The method of claim 8, wherein the signal received by the electronic switching device is sent by the primary brushless motor.

10. The method of claim 8, wherein the signal received by the electronic switching device and the signal received by the primary brushless motor are sent independently by a controller.

11. The method of claim 10, wherein the controller is an engine control unit of a vehicle.

12. The method of claim 8, wherein the electronic switching device is a MOSFET.

13. The method of claim 8, wherein the duty cycle of the pulse width modulated control signal is variable.

14. The method of claim 8, including individually powering the primary brushless motor, with the secondary brush motor being electrically connected to the primary brushless motor so as to derive power from the primary brushless motor.

15. The method of claim 8, including powering the primary brushless motor and the secondary brush motor independently.

16. The method of claim 9, wherein the primary brushless motor senses stall conditions of the secondary brush motor and sends a signal to a controller so that the controller increases the speed of the primary brushless motor.

17. A dual motor configuration for driving two fans for moving air to cool an engine, the dual motor configuration comprising:
a primary brushless motor constructed and arranged to be electronically controlled to drive a first fan over a speed range of 0 to 4000 rpm, and
a secondary brush motor constructed and arranged to be electronically controlled to drive a second fan over a speed range of 0 to 4000 rpm, the secondary brush motor including means for switching associated therewith for receiving a variable frequency pulse width modulated signal, whereby different combinations of speeds of the first and second motors can be selectively chosen to meet cooling requirements of an engine.

18. The configuration of claim 17, wherein the means for switching is a metal oxide semiconductor field effect transistor (MOSFET).

* * * * *